UNITED STATES PATENT OFFICE.

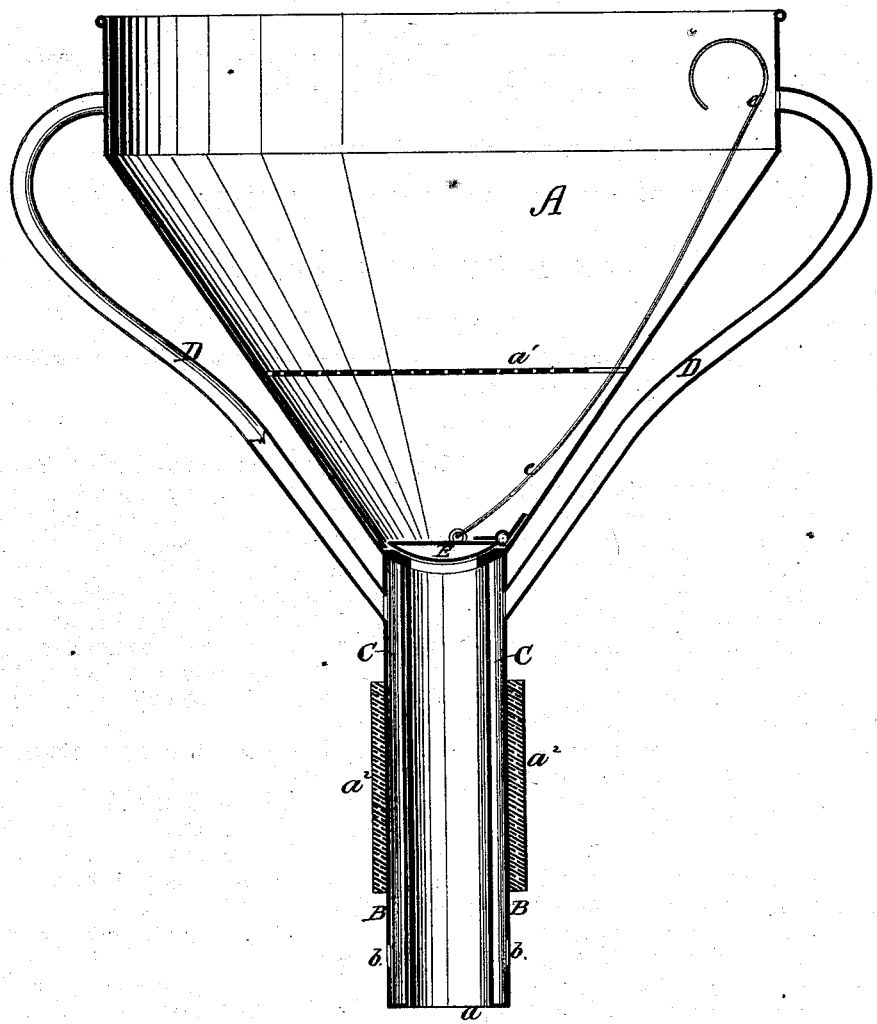

AUGUST PFORR, OF BALTIMORE, MARYLAND.

IMPROVEMENT IN FUNNELS.

Specification forming part of Letters Patent No. 159,445, dated February 2, 1875; application filed January 4, 1875.

*To all whom it may concern:*

Be it known that I, AUGUST PFORR, of Baltimore city, State of Maryland, have invented a new and Improved Funnel; and I do hereby declare that the following is a full, clear, and exact description of the same, reference being had to the accompanying drawing, forming a part of this specification, in which the drawing is a sectional elevation.

The invention relates to funnels by which liquids are run into barrels, casks, or other packages; and consists in a novel construction whereby the fullness of the barrel may be clearly indicated without any waste whatever, all as hereinafter described, and subsequently claimed.

A represents a funnel of the ordinary shape, having the discharge-nozzle $a$, that enters the bung-hole or other aperture of barrel or package; the inside filter, $a^1$, and the outside rubber gasket, $a^2$, that causes the nozzle to fit airtight. The lower end of nozzle $a$ has a jacket, B, that is laterally apertured at $b$, forms a chamber, C, and connects by tubes D D with the upper part of funnel. As soon as the barrel is filled to the proper point the liquid enters hole $b$, passes through chamber C and tubes D D, entering funnel, and indicating to the operator that no more liquid is needed. The valve E is then let down by its handle $e$, that passes up through filter into the upper part of nozzle, so as to allow the liquid to rest in the funnel.

Having thus described my invention, what I claim as new is—

The combination of funnel A $a$, having filter, and the chamber C, having tubes D D, with a handled valve, E $e$, situated between the filter and discharge $a$, as and for the purpose specified.

AUGUST PFORR.

Witnesses:
G. E. SANGSTER,
WM. D. ELDRIDGE.